UNITED STATES PATENT OFFICE.

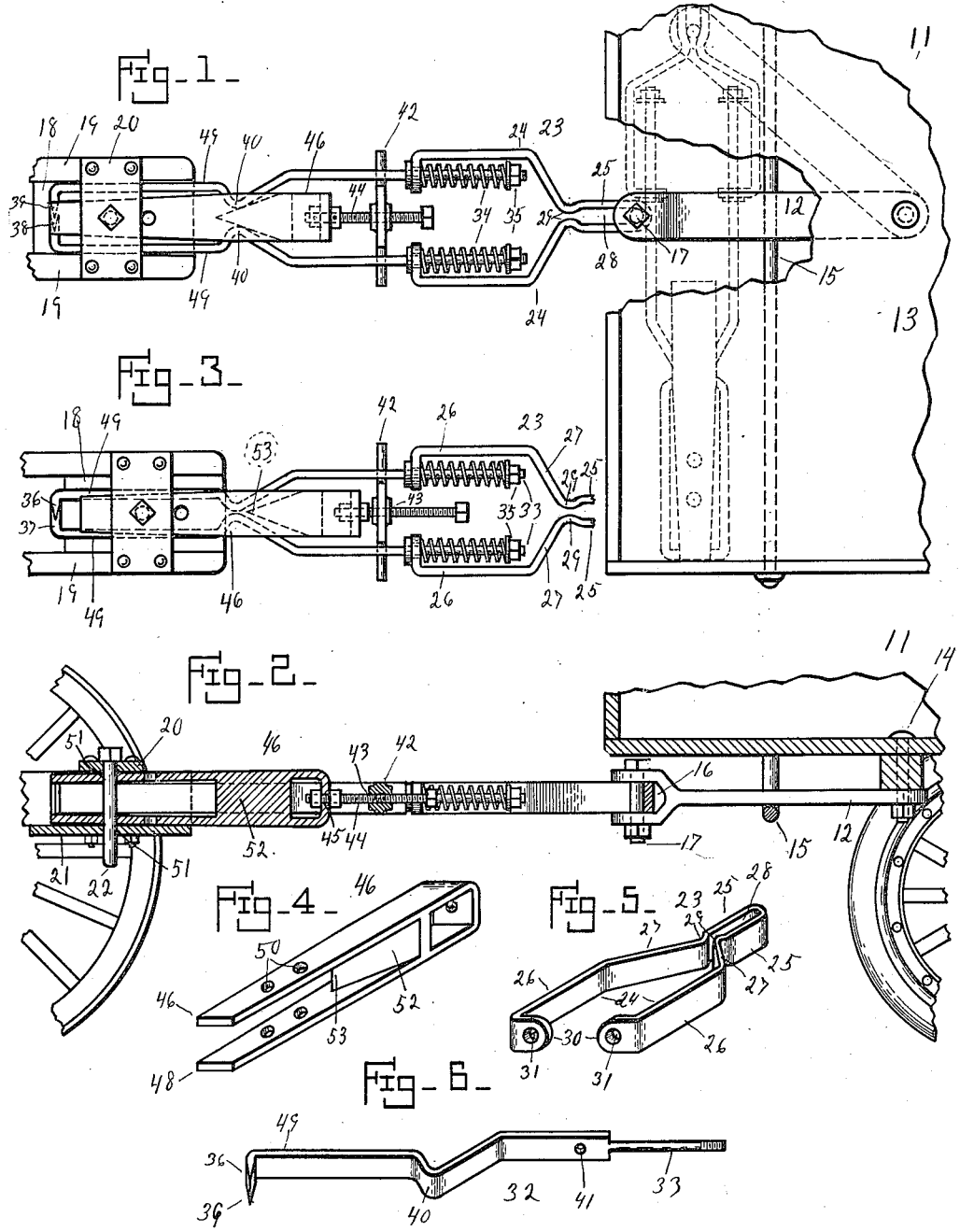

CHARLES R. BUCKMAN, OF LOUISVILLE, KENTUCKY.

COUPLING.

1,173,479.   Specification of Letters Patent.   Patented Feb. 29, 1916.

Application filed April 2, 1915. Serial No. 18,636.

*To all whom it may concern:*

Be it known that I, CHARLES R. BUCK-MAN, a citizen of the United States, residing in Louisville, in the county of Jefferson and State of Kentucky, have invented a certain new and useful Improvement in Couplings, of which the following is a specification.

This invention relates to couplers designed especially for use in connection with motor trucks for coupling another vehicle thereto, and has for an object the provision of an efficient inexpensive device of this character wherewith a trailer may be readily and securely coupled with a motor truck.

Another object is the provision of a device which may be adjusted to fit in pole pockets of different sizes.

With the foregoing and other objects in view the invention consists of the novel arrangement and construction of parts illustrated in the accompanying drawing, which forms a part of this specification, wherein is set forth an embodiment of the invention, but it is to be understood that such changes and modifications may be resorted to as come within the scope of the appended claims.

Referring to the drawings wherein similar reference characters designate like parts in the several views: Figure 1, is a plan view of a rear portion of a motor truck and of a trailer, showing in full lines my improved device, as coupling one with the other, and in dotted lines as being folded back under the truck; Fig. 2, a vertical section with parts broken away; Fig. 3, a plan showing the coupler as entered in the pole pocket of a vehicle, but with spreading members not expanded; Fig. 4, a perspective of a wedge member; Fig. 5, a perspective of the yoke; Fig. 6, a perspective of a spreading member.

Referring to the drawings —11— designates a portion of a motor truck of conventional construction, provided with a draw-bar —12—, suitably secured thereto, as illustrated it is pivotally secured to the underside of the body —13— by suitable means such as bolts —14— and the rear end is supported by a carry bar —15— which extends transversely of the truck, the draw bar is provided at its rear end with a bifurcation —16— within which the forward end of the coupler is held by means of a pin, or bolt, —17—. The rear end of the coupler is entered in a pole pocket —18—, formed by the wagon hounds —19— and hound plates —20, 21—, where it is held by means of a coupling pin —22—. A frame, or yoke —23— comprises a pair of resilient side members —24— joined at their forward ends. The side members each comprise forward and rear sections —25, and 26— lying in parallel planes and connected by an intermediate divergent section —27—. The forward sections lie in spaced relationship forming an elongated way —28— for the passage of the bolt 17, stops —29— at the rear ends of the sections 25 serve to limit the travel of the bolt 17, in the passage way 28 when the coupler is swung around under the truck-bed, to be out of the way, when not in use. On the free ends of the rear sections are lateral extensions —30— provided with eyes —31—. A pair of spreader arms —32—, preferably rectangular in cross section have reduced rounded portions —33— extended from their forward ends which pass through the eyes 31 in the yoke. Springs —34— disposed about these rods are retained thereon by means of nuts —35—. The reduced portions 33 are slightly smaller in diameter than the eyes 31 through which they pass, and are movable laterally therein, thereby forming a universal joint. Such lateral movement however as well as retractile movement thereof is resisted by the springs.

The spreader arms are disposed in substantially parallel relationship to each other and have lateral inward projections —36 and 37— on their rear ends. These projections are in alinement and are adapted to be interlocked to prevent relative longitudinal movement of the arms 32, the projection 36 having a recess, or notch —38— for the reception of a tapered, or wedge shaped end —29— on the projection 37. The spreader arms 32 are provided intermediate their length with interior opposed offsets —40—, which contact when the arms are closed. Near the forward ends of the spreader arms are alined perforations —41— in which a transverse bar —42— is positioned which is provided with a central threaded perforation —43— in which a screw threaded rod —44— operates. The rod 44 is swivelly connected at —45— with the forward end of a coupling member —46— which is positioned between the spreader arms. The coupling member comprises upper and lower plates —47, 48— joined at their forward ends and spaced to receive between them the rear portion —49— of the spreader arms. These plates are provided with a plurality of alined perforations —50— adapted to aline with perforations —51— in the hound plates of the trailing vehicle for the reception of the coupling pin 22. A wedge shaped block —52— is positioned between the plates 47, 48 and lies so the apex —53— thereof is in juxtaposition to the offsets 40 and is adapted to be entered therebetween by the operation of the rod 44, to open out the spreader arms. When not in use the coupler is swung back under the bed of the truck, as shown in dotted lines in Fig. 1, where it is out of the way, when it is desired to attach a trailer, the pole is removed from the vehicle which it is desired to couple up. The coupler is swung outward from under the truck, the coupling member 46 entered in the pole pocket of the vehicle until a pair of the alined perforations in the hound plates when the perforations 50 registers with the pin 22 is placed in position, this connects the two vehicles. The screw threaded rod 44 is then turned causing the wedge shaped block 52 to enter between offsets 40 and force the arms outward against the sides of the pole pocket. This fixes the coupler firmly in the pole pocket and prevents any lateral motion therein.

It will be observed that by the use of my improved coupler the trailing vehicle is firmly joined to the tractor yet the springs afford sufficient resilience to protect the tractor from jolts and jars imparted to the trailer by inequalities in the roadway.

Having thus described my invention so that any one skilled in the art pertaining thereto may make and use the same, I claim:

1. In a coupler, a yoke, arms extended longitudinally therefrom, a coupling member disposed between said arms and connected therewith, and means for moving said member relative to said arms to spread the same apart.

2. In a coupler, a yoke, arms yieldingly connected therewith and extended therefrom in substantial parallelism, a coupling member disposed between and connected with said arms, and means for moving said member relative to said arms to spread the same apart.

3. A coupler comprising a yoke, having an elongated contracted portion at the bow end thereof forming a passage for a coupling pin, lateral projections on the free ends of said yoke having perforations therethrough, spreader arms with reduced portions extended through said perforations disposed in substantial parallelism and extending longitudinally from said yoke, springs adapted to oppose the retraction of said portions, and a coupling member connected with said arms.

4. A coupler comprising a yoke, having an elongated contracted portion at the bow end thereof forming a passage for a coupling pin, lateral projections on the free ends of said arms having perforations therethrough, spreader arms with reduced portions extended through said perforations disposed in substantial parallelism and extending longitudinally from said yoke, springs adapted to oppose the retraction of said portions, and a coupling member connected with said arms and adapted to be adjusted longitudinally thereof to spread said arms apart.

5. A yoke, arms associated with said yoke and extending therefrom, a coupling member arranged between said arms, a bar disposed transversely of said arms and means operatively mounted in said bar and connected with said coupling member whereby the same may be moved relative to said arms to spread same apart.

6. A yoke, arms associated with and extending therefrom, yielding connections between said arms and yoke, a coupling member arranged between said arms, a bar disposed transversely of said arms and means operatively mounted in said bar and connected with said coupling member whereby the same may be moved relative to said arms to spread the same apart.

CHARLES R. BUCKMAN.